United States Patent Office 3,786,143
Patented Jan. 15, 1974

3,786,143
METHOD FOR TREATING VIRUS INFECTION AFFECTING THE BRAIN
Hans Rudolf Corrodi, Askim, Nils Erik Oskar Lycke, Frolunda, and Björn-Erik Roos, Goteborg, Sweden, assignors to Aktiebolaget Hassle, Molndal, Sweden
No Drawing. Filed Dec. 10, 1969, Ser. No. 884,024
Claims priority, application Sweden, Dec. 23, 1968, 17,745/68
Int. Cl. A61k 27/00
U.S. Cl. 424—309                3 Claims

ABSTRACT OF THE DISCLOSURE

Method for treating viral disease caused by herpes simplex virus, rabies virus, meningitis virus, or poliomyelitis virus which comprises administering a therapeutically effective dose containing at least one inhibitor of the biosynthesis of the monoamines noradrenaline, dopamine or 5-hydroxytryptamine.

---

This invention relates to a method for treating viral disease caused by herpes simplex virus, rabies virus, meningitis virus, or poliomyelitis virus using a monoamine biosynthesis inhibitor.

Substances or vaccines for treating virus infection caused by herpes simplex virus, which causes non-malignant meningitis, have not been previously known. At the present time, rabies infection is treated with a rabies vaccine. The use of rabies vaccine, however, presents a serious drawback in that it is administered after a probable infection and before the diesease has broken out, being ineffective to treat the infection once it has erupted. In addition, rabies vaccine may give allergic reactions and, in some instances, it has resulted in encephalitis.

In general, vaccines such as the rabies vaccine and the Salk vaccine for poliomyelitis only give prophylactic protection and are not useful for therapeutical purposes. Furthermore, some vaccines are specific to a particular type of virus and thus provide only a very narrow prophylactic range.

Accordingly, it is an object of the present invention to provide a method for treating viral disease caused by herpes simplex virus, rabies virus, meningitis virus, or poliomyelitis virus a monoamine biosynthesis inhibitor which is effective both before and after the infection has erupted to relieve the symptoms caused by disturbances in the function of the central nervous system and which does not give any allergic reactions.

Thus, the virus infection itself is not cured by the present invention, but the accompanying symptoms, such as excitation and convulsion, are relieved and resulting deaths are virtually eliminated.

It has been previously known that substances which inhibit the biosynthesis in mammals of the certain monoamines, namely, noradrenaline, dopamine, and 5-hydroxytryptamine, cause blood pressure lowering, sedative and antipsychotic effects. Known substances which act as inhibitors of the biosynthesis of noradrenaline are disulphiram, diethyldithiocarbamate, di(phenylethyl)dithiocarbamate, alkylpiperazine dithiocarboxylic acids and the innocuous salts thereof, bis(alkylpiperazinylthiocarbonyl)disulphides, alkylhomopiperazinedithiocarboxylic acids and the innocuous salts thereof, and bis(alkylhomopiperazinylthiocarbonyl)disulphides. These compounds inhibit the enzyme dopamine-$\beta$-hydroxylase, which cooperates in the biosynthesis of noradrenaline from dopamine.

The biosyntheses of noradrenaline and dopamine are inhibited by substances which inhibit the enzyme tyrosinehydroxylase. Tyrosinehydroxylase acts to synthesize L-dopa from L-tyrosine. Known inhibitors of this enzyme are: $\alpha$-methyltyrosine, $\alpha$-methyltyrosine methylester, $\alpha$-methyltyrosine ethylester, 3,$\alpha$-dimethyltyrosine and its alkylesters, 3-iodotyrosine and its alkylesters, 3-iodo-$\alpha$-methyltyrosine and its alkylesters, $\alpha$-methylphenylalanine and its alkylesters, $\alpha$-methyldopa and its alkylesters, $\alpha,\beta,\beta$-trimethyldopa and its alkylesters, 5-acetaamido-4H-pyrrolo-[3,4-c]-isoxazole - 5 - (6H)carboxylic acid ethylester and 3,4-dihydroxyphenylacetamide and its $\alpha$-alkyl derivatives.

The biosynthesis of 5-hydroxytryptamine is inhibited by inhibitors of the enzyme tryptophanhydroxylase which cooperates in the synthesis of L-5-hydroxytryptophan from L-tryptophan. Such inhibitors include: p-chlorophenylalanine and its alkylesters and p-chlorophenylpyruvic acid and its alkylesters, as well as 3,4-dihdyroxyphenylacetamide and its $\alpha$-alkyl derivatives.

The expression "alkyl" as used to describe the aforementioned inhibitors means primary, secondary and tertiary, saturated or unsaturated alkyl groups having straight as well as branched chains, the number of carbon atoms in each group being at most four. In the cases mentioned above, when an alkylpiperazinedithiocarboxylic acid or salt thereof, a bis(alkylpiperazinylthiocarbonyl)disulphide, an alkylhomopiperazinedithiocarboxylic acid or salt thereof, or a bis(alkylhomopiperazinylthiocarbonyl)disulphide is used, "alkyl" may also indicate the presence of more than one alkyl group, but not more than three, connected to the piperazinyl or homopiperazinyl group.

It has now been found possible to treat viral disease caused by herpes simplex virus, rabies virus, meningitis virus, or poliomyelitis virus and protect against symptoms caused by such virus infections that affect the brain, by administering to the afflicted mammal a therapeutically effective dose of at least one inhibitor of the biosynthesis of the monoamines noradrenaline, dopamine and 5-hydroxytryptamine.

A daily treatment of mice infected by intracerebral inoculation with a lethal dose of herpes simplex virus using therapeutically effective amounts of such monoamine inhibitors provided a striking decrease in the expected death rate and complete relief of pathological indications such as convulsions, excitation and hyperactivity. It has been found that animals which survive the virus infection after treatment with a monoamine inhibitor do not fall ill upon a renewed inoculation with the same virus, even if the treatment is not repeated.

In clinical practice, the inhibitors of the biosyntheses will normally be administered orally, or by means of an injection in the form of pharmaceutical preparations comprising a therapeutically effective dose of at least one inhibitor incorporated in a pharmaceutically acceptable carrier. The carrier may comprise a solid, a semi-solid or a liquid diluent or a capsule. These preparations normally contain between 0.1 and 95 percent by weight of the active compound, for example, between 0.5 and 20 percent by weight for preparations intended for injections and between 2 and 50 percent by weight for preparations intended for oral administration.

Pharmaceutical preparations are prepared in the form of dosage units for oral administration by mixing an inhibitor with a solid pulverulent carrier, for example, lactose, saccharose, sorbitol, mannitol, starch such as potato starch, corn starch, amylopectin, laminaria powder or a citrus pulp powder, cellulose derivatives, or gelatin. The preparation may also include a lubricant such as magnesium or calcium stearate, or a Carbowax or another polyethylene/glycol wax, the final mixture being compressed to form tablets. When coated tablets are required, the cores may be coated with a concentrated sugar solution which may contain, for example, gum arabic, gelatin, talcum and/or titanium dioxide. Alternatively, the tablets may be coated with a lacquer dissolved in a volatile organic solvent or a mixture of organic solvents. Dyestuffs may be added to these coatings for distinction between tablets containing different contents of the active compound. For the preparation of soft gelatin capsules (pearl-shaped closed capsules) consisting of gelatin and, for example, glycerol and similar closed capsules, the active substance may be admixed with a vegetable oil. Hard gelatin capsules may contain granulates of the active substance in combination with solid pulverulent carriers such as lactose, saccharose, sorbitol, mannitol, starches for example, potato starch, corn starch or amylopectin, cellulose derivatives or gelatin.

Liquid preparations for oral administration may be in the form of syrups or suspensions, for example, solutions containing from about 2 to 20 percent by weight of the active compound, sugar and a mixture of ethanol, water and glycerol, propenglycol and, in addition, flavoring agents, saccharine and/or carboxymethyl cellulose as a thickening agent.

For parenteral administration by means of injection, the preparations according to the invention preferably comprise an aqueous solution of the active compound preferably in a concentration of 0.5–10 percent by weight and further a stabilizing agent and/or a buffering agent. For convenience, it might be desirous to inclose the dosage units of the solution in ampoules.

The dosage amount depends upon the active compound or compounds used, the manner of administration and the desired therapeutic effect. Generally, the dose varies from 0.5 milligram to about 75 milligrams per kilo of the body weight at a peroral one-shot dose.

The present invention will now be described in greater detail with reference to the following examples. These examples are for illustrative purposes only and are not intended to limit the invention in any way.

EXAMPLE 1

Three groups of mice (Swiss albino mice) comprising 70, 66 and 230 mice, respectively, were infected intracerebrally with a dose 16 times greater than the $LD_{50}$ dose of herpes simplex virus (strain 2 gbg 10). The $LD_{50}$ dose is that which kills 50% of the animals injected intraperitoneally with the virus. The group comprising 230 mice was treated every day with α-methyltyrosine methylester. In this case the active substance was injected subcutaneously in a quantity of 285 milligrams per kilo body weight. Two groups were not treated at all and formed control groups. A fourth group of mice was also used as a separate control group being treated with the inhibitor without any intracerebral inoculation of herpes simplex virus. The animals were observed daily and pathological symptoms such as convulsions and excitation and the number of dead animals were registered. The results are reported in Table I:

TABLE I

| Treatment | Number of animals | Symptoms | | | |
|---|---|---|---|---|---|
| | | Day | Dead animals | Convulsion | Excitation |
| Herpes simplex only | 70 | 5 | 15 | 29 | 26 |
| Do | 66 | 7 | 64 | 2 | 0 |
| α-Methyltyrosine methylester plus herpes simplex | 230 | 5 | 0 | 0 | 0 |
| α-Methyltyrosine methylester only | 70 | 8 | 0 | 0 | 0 |

EXAMPLE 2

In order to study the effects in treatment using different injected quantities of α-methyltyrosine methylester, four groups of mice comprising 70 mice each were infected by intracerebral inoculation with 16 times the $LD_{50}$ of herpes simplex virus. One group was a control group, while the other three groups were treated with 100, 150 and 250 milligrams of α-methyltyrosine methylester per kilo body weight by means of an intraperitoneal injection. The results are reported in Table II:

TABLE II

| Treatment | Number of animals | Symptoms | | | |
|---|---|---|---|---|---|
| | | Day | Dead animals | Convulsion | Excitation |
| Herpes simplex only | 70 | 5 | 28 | 8 | 34 |
| 100 mg. of α-methyltyrosine methylester plus herpes simplex | 70 | 5 | 4 | 3 | 63 |
| 150 mg. of α-methyltyrosine methylester plus herpes simplex | 70 | 5 | 0 | 0 | 0 |
| 250 mg. of α-methyltyrosine methylester plus herpes simplex | 70 | 5 | 0 | 0 | 0 |

It is apparent from the two tables that a striking decrease in deaths and pathological symptoms is achieved when the virus-infected mice are treated with a monoamine biosynthesis inhibitor.

What is claimed is:

1. A method for treating mammals afflicted with a virus infection affecting the brain selected from the grouping consisting of herpes simplex virus, rabies virus, meningitis virus, and poliomyelitis virus which comprises administering to a mammal afflicted with such an infection, a therapeutically effective dose, sufficient to relieve the accompanying symptoms of the disease and to prevent death, of a monoamine biosynthesis inhibitor selected from the group consisting of α-methyltyrosine and alkylesters thereof, wherein the alkyl group has at most 4 carbon atoms.

2. A method according to claim 1 wherein the virus infection is caused by herpes simplex virus.

3. A method according to claim 1 wherein the inhibitor is α-methyltyrosine methylester.

References Cited

FOREIGN PATENTS 6601045    8/1966    Netherlands _____ 424—309

OTHER REFERENCES

Chemical Abstracts, 65:20214g (1966).

Antibiotic News, vol. 5, No. 9, October 1968, pp. 1 and 3.

JEROME D. GOLDBERG, Primary Examiner

U.S. Cl. X.R.

424—319